US010761201B2

(12) United States Patent
Okazaki et al.

(10) Patent No.: US 10,761,201 B2
(45) Date of Patent: Sep. 1, 2020

(54) OBJECT DETECTION DEVICE AND RECORDING MEDIUM

(71) Applicant: Panasonic Intellectual Property Management Co., Ltd., Osaka (JP)

(72) Inventors: Yukio Okazaki, Kanagawa (JP); Hirofumi Nishimura, Kanagawa (JP); Asako Hamada, Kanagawa (JP)

(73) Assignee: Panasanic Intellectul Property Management Co., Ltd., Osaka (JP)

( * ) Notice: Subject to any disclaimer, the term of this patent is extended or adjusted under 35 U.S.C. 154(b) by 308 days.

(21) Appl. No.: 15/834,791

(22) Filed: Dec. 7, 2017

(65) Prior Publication Data
US 2018/0172814 A1     Jun. 21, 2018

(30) Foreign Application Priority Data

Dec. 20, 2016  (JP) ................. 2016-246943

(51) Int. Cl.
*G01S 13/42*     (2006.01)
*G01S 13/04*     (2006.01)
(Continued)

(52) U.S. Cl.
CPC ............ *G01S 13/426* (2013.01); *G01S 13/04* (2013.01); *G01S 13/524* (2013.01);
(Continued)

(58) Field of Classification Search
CPC ...... G01S 13/04; G01S 13/426; G01S 13/524; G01S 13/931; G08G 1/166; G08G 2013/9339
See application file for complete search history.

(56) References Cited

U.S. PATENT DOCUMENTS 5,337,257 A * 8/1994 White ..................... G01S 7/415
                                                    701/117
5,343,206 A * 8/1994 Ansaldi ................. G01S 13/931
                                                    342/179

(Continued)

FOREIGN PATENT DOCUMENTS

EP        2631673 A1     8/2013
JP     2015-055541 A     3/2015

OTHER PUBLICATIONS

Extended European Search Report dated May 29, 2018 for the related European Patent Application No. 17206134.3.

*Primary Examiner* — Peter M Bythrow
(74) *Attorney, Agent, or Firm* — Seed IP Law Group LLP

(57) ABSTRACT

An object detection device includes: a classifier that receives, from a radar device that transmits a transmission wave and receives a reflected wave that is the transmission wave reflected by an object around a subject vehicle, detection result information indicative of an intensity, an azimuth, and a Doppler velocity obtained from a Doppler frequency shift of the reflected wave, and determines whether the detection result information is first detection result information corresponding to a moving object or second detection result information corresponding to a still object; a calculator that calculates distances from the radar device to reflection points of the moving object on the basis of the first detection result information; and an output that supplies, to a predetermined device, first reflection point information indicating the distances of the reflection points and azimuths of the reflection points based on the radar device.

7 Claims, 13 Drawing Sheets

(51) Int. Cl.
  *G08G 1/16* (2006.01)
  *G01S 13/931* (2020.01)
  *G01S 13/524* (2006.01)
(52) U.S. Cl.
  CPC ............ *G01S 13/931* (2013.01); *G08G 1/166* (2013.01); *G01S 2013/9329* (2020.01)

(56) References Cited

U.S. PATENT DOCUMENTS

| | | | | |
|---|---|---|---|---|
| 5,638,281 | A * | 6/1997 | Wang | G01J 3/453 |
| | | | | 701/301 |
| 6,438,491 | B1 * | 8/2002 | Farmer | B60W 30/16 |
| | | | | 340/435 |
| 8,310,376 | B2 * | 11/2012 | Frank | G01S 7/527 |
| | | | | 340/425.5 |
| 2002/0044082 | A1 * | 4/2002 | Woodington | B60K 31/0008 |
| | | | | 342/70 |
| 2003/0076255 | A1 * | 4/2003 | Ono | G01S 13/34 |
| | | | | 342/70 |
| 2004/0189514 | A1 * | 9/2004 | Schlick | G01S 7/4004 |
| | | | | 342/165 |
| 2006/0022866 | A1 * | 2/2006 | Walton | G01S 7/352 |
| | | | | 342/194 |
| 2007/0152870 | A1 * | 7/2007 | Woodington | G01S 7/414 |
| | | | | 342/70 |
| 2010/0332078 | A1 * | 12/2010 | Hering | G01S 15/87 |
| | | | | 701/36 |
| 2011/0074620 | A1 * | 3/2011 | Wintermantel | G01S 7/032 |
| | | | | 342/70 |
| 2013/0321195 | A1 * | 12/2013 | Moriuchi | G01S 13/52 |
| | | | | 342/70 |
| 2014/0343749 | A1 * | 11/2014 | Minemura | B60W 30/0953 |
| | | | | 701/1 |
| 2014/0368373 | A1 * | 12/2014 | Crain | G01S 5/02 |
| | | | | 342/5 |
| 2016/0161609 | A1 * | 6/2016 | Tanaka | G01S 13/931 |
| | | | | 342/71 |
| 2016/0170020 | A1 * | 6/2016 | Hamada | G01S 13/66 |
| | | | | 342/70 |
| 2016/0320482 | A1 * | 11/2016 | Ling | G01S 13/931 |

* cited by examiner

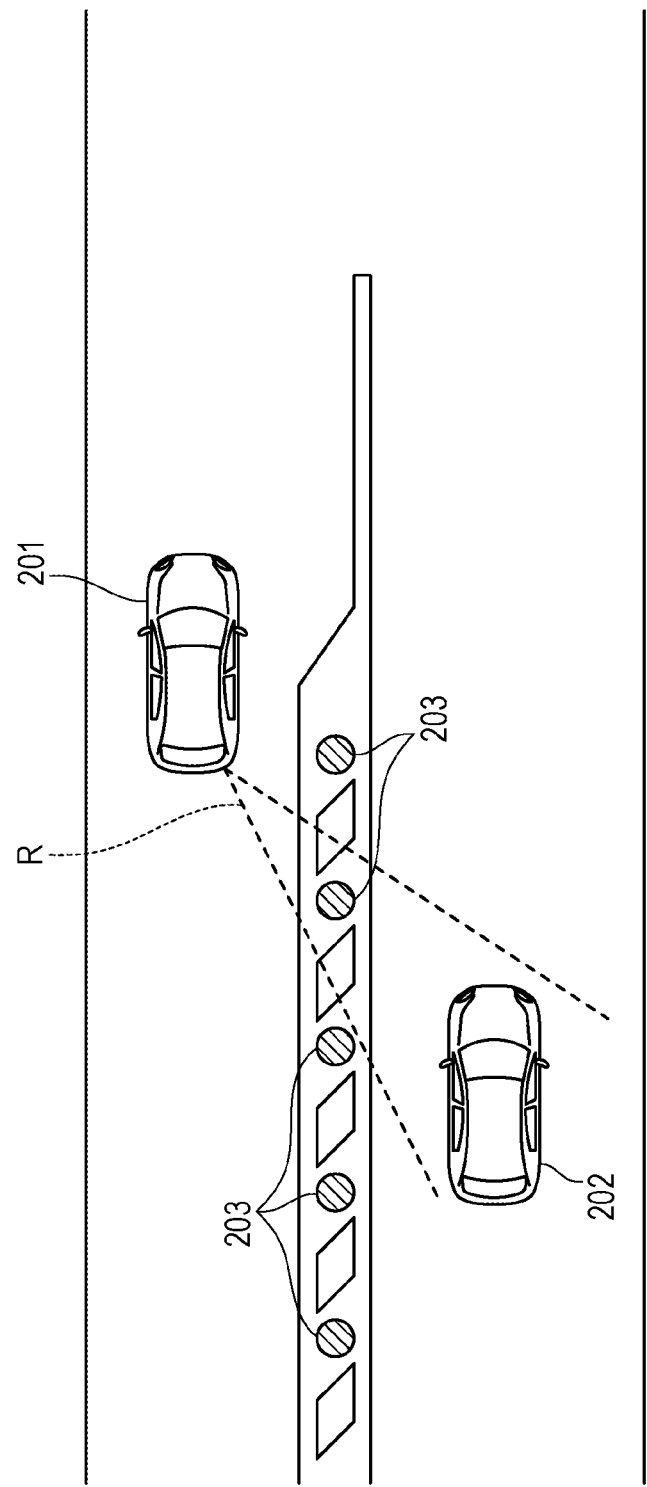

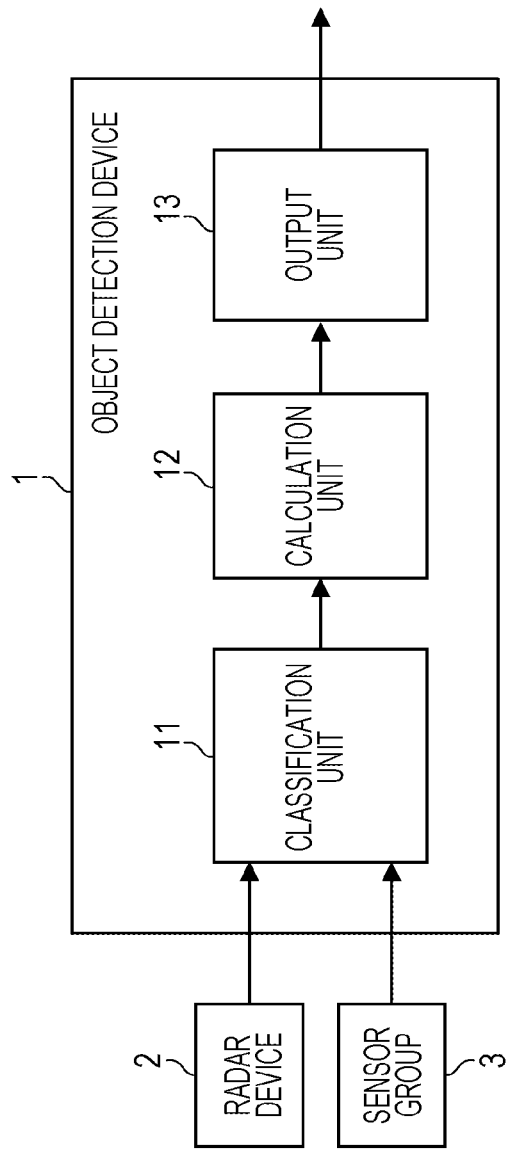

OBJECT DETECTION DEVICE AND RECORDING MEDIUM

BACKGROUND

1. Technical Field

The present disclosure relates to an object detection device and a recording medium for detecting an object around a vehicle.

2. Description of the Related Art

Conventionally, a technique is known for detecting an object (e.g., a moving object that is another vehicle or a still object that is a roadside object) around a vehicle such as an automobile by using a radar wave and issuing a warning or stopping or steering a vehicle in order to avoid collision in a case where there is a risk of collision of the vehicle with the object.

For example, Japanese Unexamined Patent Application Publication No. 2015-055541 discloses an object detection device that determines the type of object by matching between a reflection pattern detected by using a radar wave and a template pattern that is prepared in advance.

However, according to the object detection device disclosed in Japanese Unexamined Patent Application Publication No. 2015-055541, an object for which a template pattern is not prepared cannot be detected, and it is therefore difficult to accurately detect an object.

SUMMARY

One non-limiting and exemplary embodiment facilitates providing an object detection device and a recording medium that make it possible to improve accuracy of detection of an object around a vehicle.

In one general aspect, the techniques disclosed here feature an object detection device including: a classifier that receives, from a radar device that transmits a transmission wave and receives a reflected wave that is the transmission wave reflected by a moving object such as another vehicle (object vehicle) around a subject vehicle, detection result information indicative of an intensity, an azimuth, and a velocity (hereinafter referred to as a Doppler velocity) obtained from a Doppler frequency shift of the reflected wave, and determines whether the detection result information is first detection result information corresponding to a moving object or second detection result information corresponding to a still object; a calculator that calculates distances from the radar device to respective reflection points of the moving object on a basis of the first detection result information; and an output that supplies, to a predetermined device, first reflection point information indicative of the distances of the respective reflection points of the moving object and azimuths of the respective reflection points of the moving object based on the radar device.

According to the present disclosure, it is possible to improve accuracy of detection of an object around a vehicle.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a plan view illustrating an example of a situation where vehicle are running at a point where two traffic lanes merge;

FIG. 2 is a block diagram illustrating an example of a configuration of an object detection device according to Embodiment 1;

DETAILED DESCRIPTION

Figure 3A:
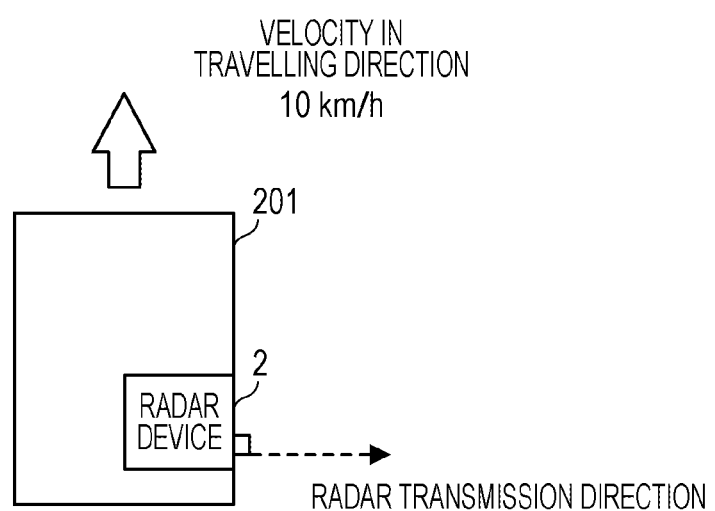
FIG. 3A illustrates a traveling velocity of a vehicle and an installation angle of a radar device according to Embodiment 1.

FIG. 1 is a plan view illustrating an example of a situation where vehicles are running at a point where two traffic lanes merge. In FIG. 1, a subject vehicle 201 and object vehicle 202 are running in the same direction on different traffic lanes. Hereinafter, the term "front" indicative of a direction is used to refer to a traveling direction of the subject vehicle 201 or object vehicle 202. Hereinafter, the terms "rear", "left", and "right" indicative of directions are used to refer to the respective directions assuming that the traveling direction of the subject vehicle 201 or object vehicle 202 is a front direction.

A radar device (not illustrated) in mounted on a right rear side of the subject vehicle 201, and the radar device transmits a transmission wave that is an electromagnetic wave to a scan range R. Furthermore, the radar device receives a reflected wave that is the transmission wave reflected by object vehicle 202 present in the scan range R.

As illustrated in FIG. 1, in a case where pylons 203 are present between the two traffic lanes, the radar device also receives a reflected wave reflected by a pylon 203 within the scan range R in addition to the reflected wave reflected by object vehicle 202. In a case where a wave reflected by a surrounding still object and a wave reflected by the moving object vehicle 202 are detected by the radar device, it is therefore difficult to accurately measure a distance between the radar device and the moving object vehicle 202. Consequently, it is difficult to predict a timing of collision between the subject vehicle 201 and object vehicle 202 and give a warning about the collision.

Furthermore, a shape of object vehicle 202 and a shape and an interval of the pylons 203 present between the subject vehicle 201 and object vehicle 202 vary depending time and place. However, an accurate warning about collision and accurate steering are needed even in such a situation. In view of the circumstances, an object detection device that makes it possible to detect a distance to and a shape of a moving object having any shape.

Embodiments are described below with reference to the drawings.

Embodiment 1

First, a configuration of an object detection device according to Embodiment 1 is described with reference to FIG. 2. FIG. 2 is a block diagram illustrating an example of a configuration of an object detection device 1 according to the present embodiment.

The object detection device 1, a radar device 2, and a sensor group 3 illustrated in FIG. 2 are mounted on a subject vehicle 201.

As illustrated in FIG. 2, the object detection device 1 is electrically connected to the radar device 2 and the sensor group 3.

The radar device 2 is, for example, a pulse compression millimeter-wave radar device. The radar device 2 transmits a transmission wave that is an electromagnetic wave and receives a reflected wave that is the transmission wave reflected by an object around the subject vehicle 201. Then, the radar device 2 supplies, to the object detection device 1, information (hereinafter collectively referred to as detection result information) on an intensity, an azimuth, a Doppler velocity that is a velocity obtained from a Doppler frequency shift, and the like of the reflected wave. The Doppler velocity is a velocity of an object relative to the radar device 2. For example, the radar device 2 calculates a Doppler velocity by converting a Doppler frequency shift component into a Doppler velocity component.

The sensor group 3 includes a plurality of sensors. For example, the sensor group 3 includes a vehicle velocity sensor that detects a velocity of the subject vehicle 201, an angular velocity sensor that detects an angular velocity of the subject vehicle 201, an installation angle sensor that detects an installation angle of the radar device 2, and a steering angle sensor that detects a steering angle of the subject vehicle 201. Information (hereinafter collectively referred to as vehicle information) on a vehicle velocity, an angular velocity, an installation angle, a steering angle, and the like detected by these sensors is supplied from the sensors to the object detection device 1.

The object detection device 1 includes a classification unit 11, a calculation unit 12, and an output unit 13. The object detection device 1 includes, for example, a central processing unit (CPU), a recording medium such as a read only memory (ROM) in which a control program is stored, a working memory such as a random access memory (RAM), and a communication circuit, each of which is not illustrated. Functions (details thereof will be described later) of the classification unit 11, the calculation unit 12, and the output unit 13 illustrated in FIG. 1 are realized by CPU's execution of the control program.

The control program may be stored in a recording medium such as a DVD or a USB memory or may be stored in a server device on a network so as to be downloadable over the network.

The classification unit 11 determines whether an object detected around the subject vehicle 201 is classified as detection result information corresponding to a still object or detection result information corresponding to a moving object on the basis of detection result information received from the radar device 2 and a relationship between an azimuth of a still object based on the radar device 2 and a Doppler velocity (hereinafter referred to as a still object curve; details thereof will be described later) and supplies the detection result information corresponding to a moving object to the calculation unit 12. For example, the classification unit 11 classifies detection result information receives from the radar device 2 as detection result information corresponding to a moving object (an example of first detection result information) or detection result information corresponding to a still object (an example of second detection result information) on the basis of the still object curve and supplies the detection result information corresponding to a moving object to the calculation unit 12.

The still object is, for example, a pylon, a noise barrier, a roadside object, a road shoulder, a guard rail, or a traffic sign. The moving object is, for example, object vehicle 202 (e.g., an automobile or a motorcycle).

Figure 3B:
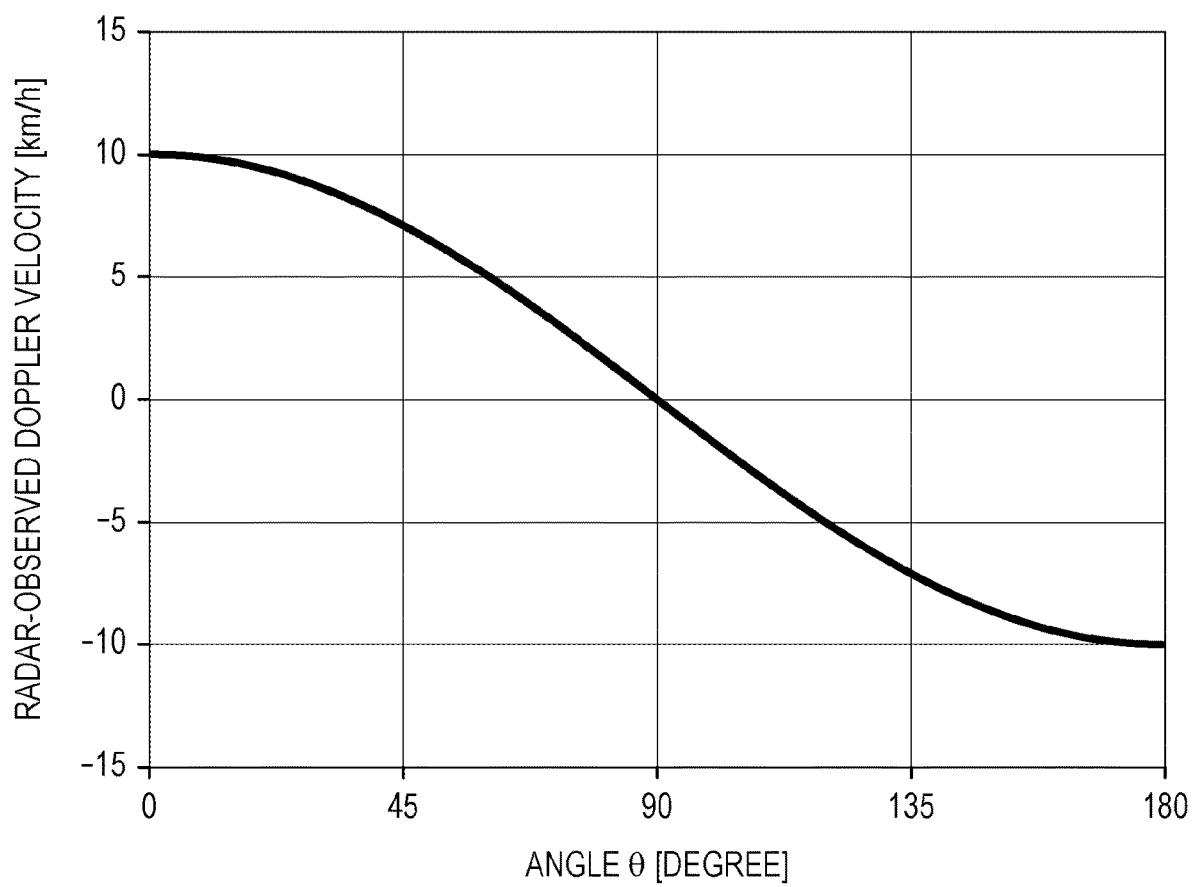
FIG. 3B illustrates an example of a still object curve according to Embodiment 1.

FIG. 3A illustrates a traveling velocity of a vehicle and an installation angle of a radar device according to Embodiment 1. In FIGS. 3A and 3B, it is assumed that an angle of the traveling direction of the subject vehicle 201 on which the radar device 2 is mounted is 0 degree, a right side of the subject vehicle 201 with respect to the traveling direction of the subject vehicle 201 is a positive angle, and a left side of the subject vehicle 201 with respect to the traveling direction of the subject vehicle 201 is a negative angle.

It is assumed here that the radar device 2 is installed so that radar is transmitted in a direction of 90 degrees from the traveling direction of the subject vehicle 201 and that the subject vehicle 201 is running at 10 km/h, as illustrated in FIG. 3A. In the traveling direction of the subject vehicle 201, a still object has a Doppler velocity of 10 km/h, which is the same as the velocity of the subject vehicle 201. Meanwhile, a Doppler velocity of a still object present in the direction of 90 degrees from the traveling direction of the subject vehicle 201 is 0 km/h.

FIG. 3B illustrates an example of the still object curve according to Embodiment 1. The horizontal axis represents an angle [degree], and the vertical axis represents a radar-observed Doppler velocity [km/h]. The still object curve is an azimuth-Doppler velocity curve (Doppler velocity characteristics) that is obtained since the velocity of a still object is expressed as $X \cos \theta$ in a case where the velocity of the subject vehicle 201 in the traveling direction is X km/h and the still object is present in a direction of an angle $\theta$ from the traveling direction of the subject vehicle 201.

For example, the classification unit 11 calculates a still object curve on the basis of vehicle information received from the sensor group 3. Then, the classification unit 11 determines that detection result information that is not on the calculated still object curve is detection result information corresponding to a moving object and determines that detection result information that is on the calculated still object curve is detection result information corresponding to a still object. Then, the classification unit 11 supplies the detection result information corresponding to a moving object to the calculation unit 12.

An example in which the classification unit 11 calculates a still object curve has been described above. Alternatively, the still object curve may be calculated by a unit other than the classification unit 11 and be supplied to the classification unit 11 (the same applies to Embodiment 2 and subsequent embodiments that will be described later).

The calculation unit 12 calculates distances from the radar device 2 to reflection points of a moving object on the basis of the detection result information corresponding to a moving object received from the classification unit 11 and supplies reflection point information of the moving object indicative of the calculated distances and azimuths of the reflection points of the moving object to the output unit 13. The distances and azimuths may be distances and azimuths to reflection points of a moving object closest to the radar device 2 and having a reflected wave intensity that is equal to or higher than a threshold value (a value determined in advance on the basis of actual measurement, simulation, or the like). The azimuths indicated by the reflection point information of the moving object are azimuths of the reflection points of the moving object based on the radar device 2.

Figure 4:
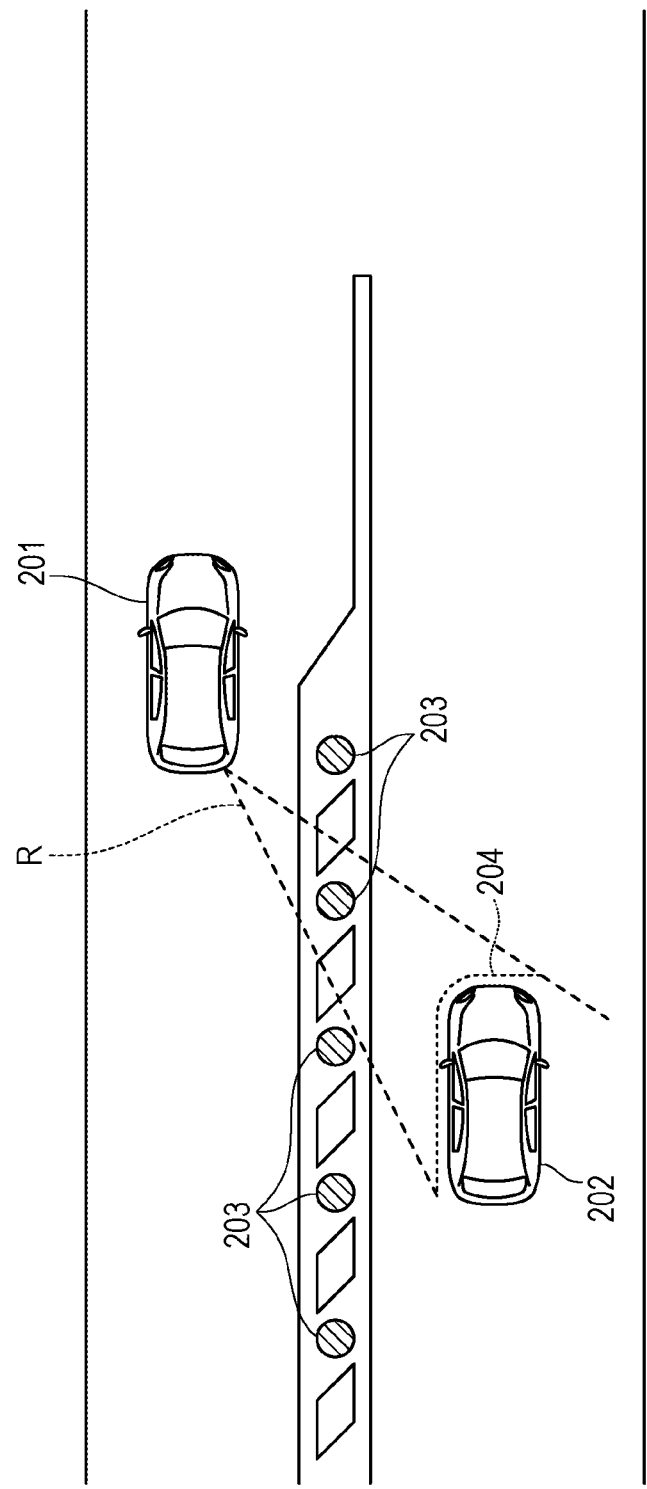
FIG. 4 illustrates an example of a reflection point group according to Embodiment 1.

FIG. 4 illustrates an example of a reflection point group for which an azimuth and a distance have been calculated by the calculation unit 12. In FIG. 4, constituent elements that are identical to those in FIG. 1 are given identical reference signs, and description thereof is omitted.

As illustrated in FIG. 4, for example, a reflection point group 204 includes a plurality of reflection points of a moving objects on a front and left sides of object vehicle 202. In this case, reflection point information of the moving object is information indicative of azimuths and distances of the respective reflection points of the moving object included in the reflection point group 204. It can therefore be said that the reflection point information of the moving object is object information indicative of the position and shape of object vehicle 202. The reflection point information of the moving object may include information on azimuths viewed from the radar, reflection intensities, and Doppler velocities of the reflection points of the moving object.

The output unit 13 supplies (transmits) the reflection point information of the moving object received from the calculation unit 12 to a predetermined device. The predetermined device is, for example, an ECU of an advanced driving assistant system (ADAS)-electronic control unit (ECU), a storage device, or a display device. The ADAS-ECU is provided, for example, in a warning device that warns a driver about a risk upon approach of the subject vehicle 201 to an object or a driving assistance device (automated driving device) that predicts a period to collision of the subject vehicle 201 with an object and avoid collision by controlling, for example, a steering angle, an accelerator, and a brake.

An example of the configuration of the object detection device 1 has been described above.

Figure 5:
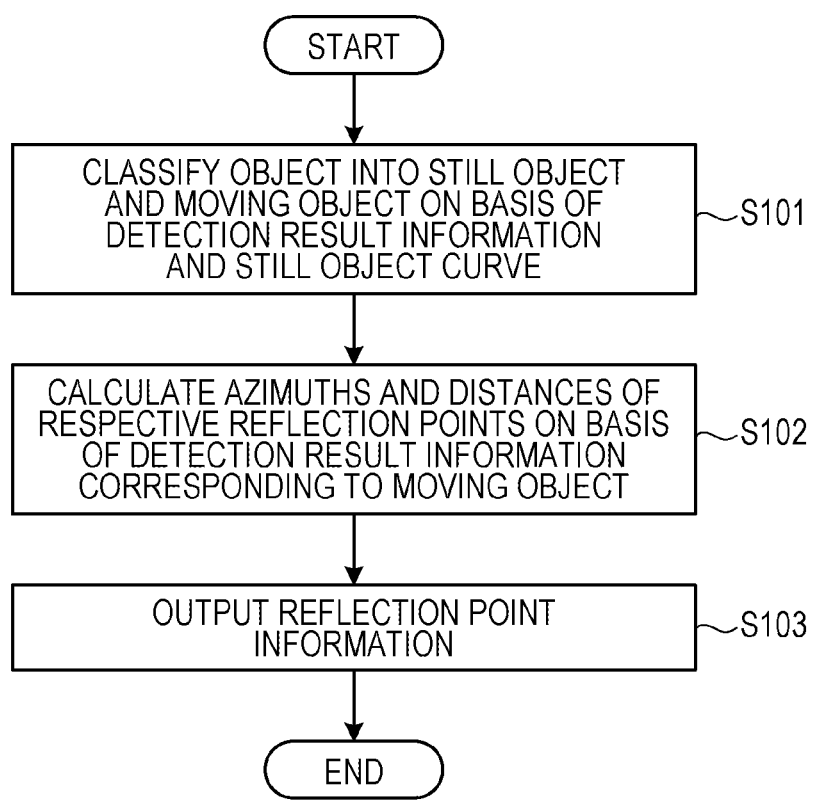
FIG. 5 is a flowchart illustrating an example of an operation of the object detection device according to Embodiment 1.

Next, an operation of the object detection device 1 is described with reference to FIG. 5. FIG. 5 is a flowchart illustrating an example of an operation of the object detection device 1.

First, the classification unit 11 determines whether a detected object is classified as detection result information corresponding to a still object or detection result information corresponding to a moving object on the basis of detection result information received from the radar device 2 and the still object curve (Step S101). Then, the classification unit 11 supplies the detection result information corresponding to a moving object to the calculation unit 12.

Next, the calculation unit 12 calculates distances of reflection points of the moving object on the basis of the detection result information corresponding to a moving object (Step S102). Then, the calculation unit 12 supplies reflection point information of the moving object indicative of distances and azimuths of the reflection points of the moving object to the output unit 13.

Next, the output unit 13 supplies the reflection point information of the moving object to a predetermined device (Step S103).

An example of an operation of the object detection device 1 has been described above.

According to the present embodiment, it is determined whether an object detected by the radar device 2 is classified as detection result information corresponding to a still object or detection result information corresponding to a moving object, distances of reflection points of the moving object are calculated on the basis of the detection result information corresponding to a moving object, and reflection point information of the moving object indicative of distances and azimuths of the reflection points is output. This makes it possible to detect a moving object having any shape and a position thereof. Since objects of various shapes can be detected, detection accuracy improves, as compared with a case where pattern matching is used.

Furthermore, according to the present embodiment, distances of reflection points of the moving object are calculated on the basis of the detection result information corresponding to a moving object, and reflection point information of the moving object indicative of distances and azimuths of the reflection points of the moving object is output. This makes it possible to detect a position and a shape of the moving object even in a case where a still object (e.g., a pylon 203) is present between the subject vehicle 201 and the moving object (e.g., object vehicle 202). It is therefore possible to detect the position of object vehicle 202 earlier at the merging point of FIG. 1. In a case where a collision warning is issued, measurement is conducted plural times in order to determine that object vehicle 202 is present or absent with certainty. It is determined that object vehicle 202 is present and a warning is issued in a case where the number of times of detection of an object vehicle among the plural measurements is equal to or larger than a reference value, i.e., in a case where the percentage of the presence of the object vehicle is equal to or larger than a reference value. Furthermore, a distance and a relative velocity to object vehicle 202 become more accurate as the number of measurements becomes larger. In a case where it is possible to start measurement earlier, the percentage of presence, a distance, and a predicted course of object vehicle 202 can be calculated a larger number of times, and a collision time can be calculated earlier. It is therefore possible to issue a more accurate warning. The same applies to steering for avoiding collision. Since the course of object vehicle 202 can be calculated earlier, more accurate steering is possible.

Furthermore, according to the present embodiment, a warning device or a driving assistance device can provide more accurate warning or more certain driving assistance by using reflection point information detected with high accuracy.

Embodiment 2

Figure 6:
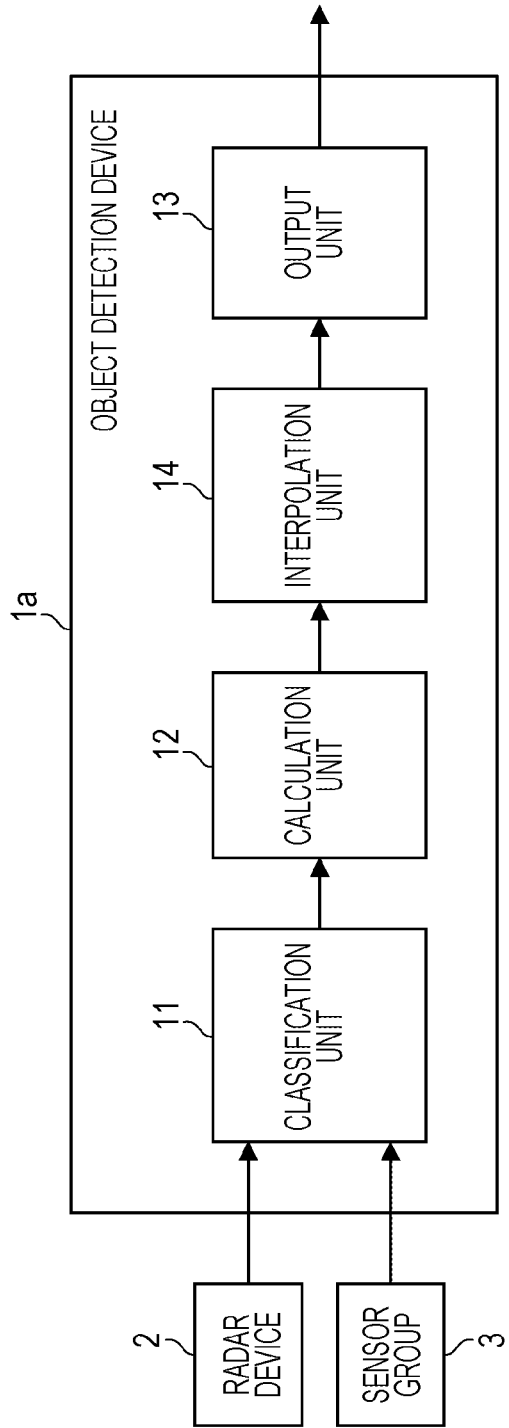
FIG. 6 is a block diagram illustrating an example of a configuration of an object detection device according to Embodiment 2.

Next, a configuration of an object detection device according to Embodiment 2 is described with reference to FIG. 6. FIG. 6 is a block diagram illustrating an example of a configuration of an object detection device 1a according to the present embodiment. In FIG. 6, constituent elements that are identical to those in FIG. 2 are given identical reference signs, and description thereof is omitted.

The object detection device 1a is different from the configuration of FIG. 2 in that the object detection device 1a includes an interpolation unit 14.

A Doppler velocity of detection result information is 0 in a direction (hereinafter referred to as a right-angled direction) that crosses at right angles with a traveling direction of a vehicle. Therefore, there is a possibility that the classification unit 11 classifies a moving object present in a right-angled direction as a still object.

For example, in a case where a plurality of reflection points included in the reflection point group 204 illustrated in FIG. 4 are present in a right-angled direction with respect to the traveling direction of the subject vehicle 201, the object detection device 1 undesirably determines that these reflection points are reflection points of a still object. Therefore, according to the object detection device 1, detection result information corresponding to a moving object in which part of the reflection point group 204 is missing is supplied to the calculation unit 12 in some cases. As a result, there is a possibility that the shape of object vehicle 202 illustrated in FIG. 4 is, for example, divided into two parts and is not accurately detected.

In view of this, in a case where a moving object is present in a right-angle direction with respect to the traveling direction of the subject vehicle 201, the interpolation unit 14 performs interpolation on distances of reflection points of the moving object indicated by reflection point information received from the calculation unit 12 on the basis of a distance of a reflection point present in an azimuth shifted from the right-angled direction by a predetermined angle (a margin angle $\pm \theta$ m). Then, the interpolation unit 14 supplies reflection point information indicative of azimuths of the reflection points and the distances of the reflection points that have been subjected to interpolation to the output unit 13.

As described above, according to the present embodiment, it is possible to detect a shape of a moving object that is present in a right-angled direction.

Embodiment 3

Figure 7:
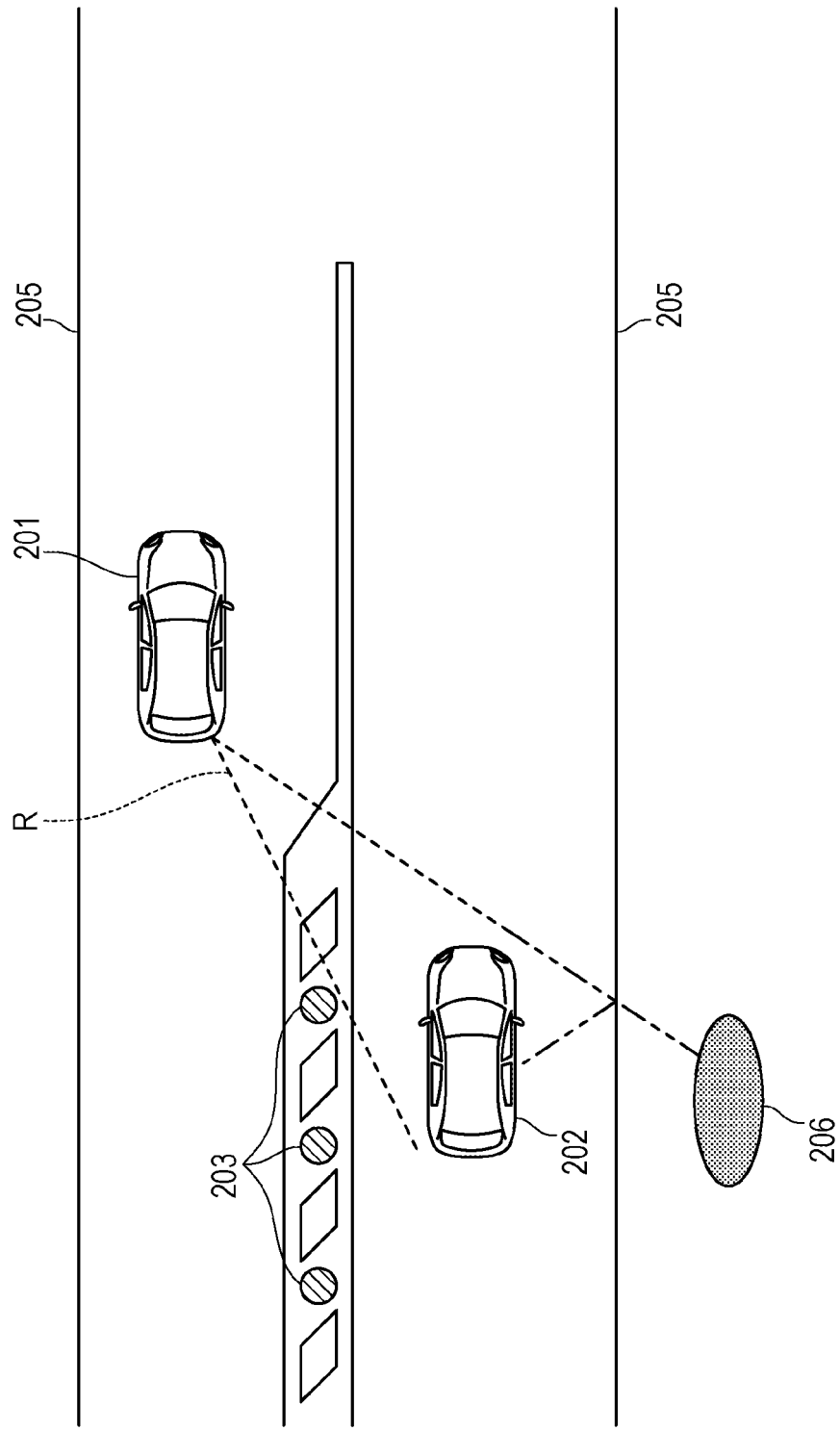
FIG. 7 is a plan view illustrating an example of a situation where vehicle are running at a point where two traffic lanes merge.

FIG. 7 is a plan view illustrating an example of a situation where vehicles are running at a point where two traffic lanes merge, as in FIG. 1. In FIG. 7, constituent elements that are identical to those in FIG. 1 are given identical reference signs, and description thereof is omitted.

In FIG. 7, a wall 205 that is a still object is present beside a traffic lane on which a subject vehicle 201 is running and beside a traffic lane on which object vehicle 202 is running. Since a transmission wave reflected by the wall 205 is reflected by a right side face of object vehicle 202, a conventional object detection device sometimes detects, outside the wall 205, a virtual image 206 corresponding to object vehicle 202. In the present embodiment, detection of the virtual image 206 is prevented.

Figure 8:
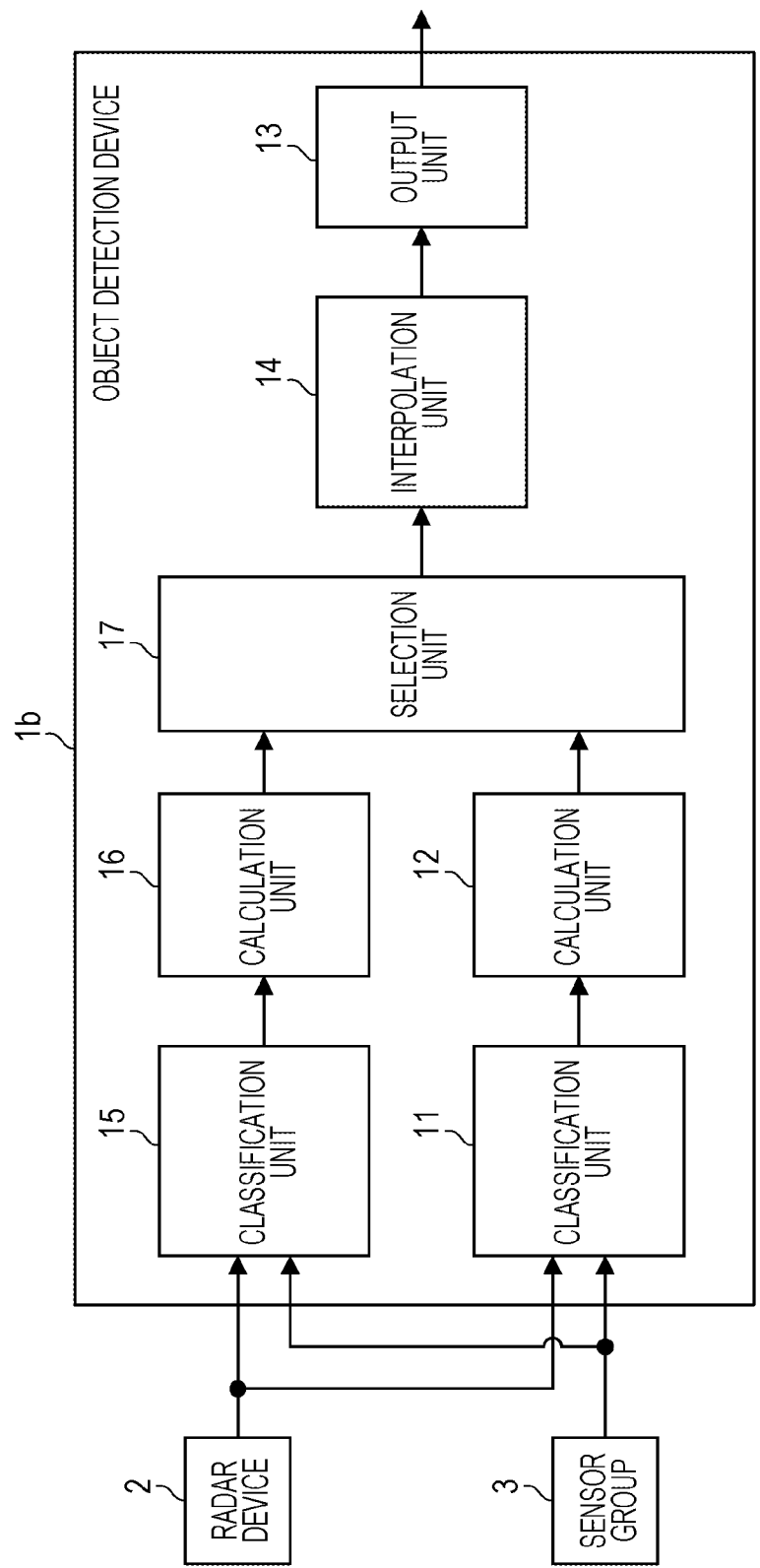
FIG. 8 is a block diagram illustrating an example of a configuration of an object detection device according to Embodiment 3.

Next, a configuration of an object detection device according to Embodiment 3 is described with reference to FIG. 8. FIG. 8 is a block diagram illustrating an example of a configuration of an object detection device 1b according to the present embodiment. In FIG. 8, constituent elements that are identical to those in FIG. 6 are given identical reference signs, and description thereof is omitted.

The object detection device 1b is different from the configuration of FIG. 6 in that the object detection device 1b includes a classification unit 15, a calculation unit 16, and a selecting unit 17.

In FIG. 8, a calculation unit (moving object calculation unit) 12 supplies, to the selecting unit 17, reflection point information (hereinafter referred to as moving object reflection point information; an example of first reflection point information) of a moving object indicative of distances and azimuths of reflection points of the moving object.

The classification unit (still object classification unit) 15 determines whether an object detected around a subject vehicle 201 is classified as detection result information corresponding to a still object or detection result information corresponding to a moving object on the basis of detection result information received from a radar device 2 and a still object curve. This process is similar to the process performed by a classification unit 11. The classification unit 15 supplies the detection result information corresponding to a still object to the calculation unit (still object calculation unit) 16.

The calculation unit 16 calculates distances and azimuths of reflection points of the still object on the basis of the detection result information corresponding to a still object received from the classification unit 15. This process is similar to the process performed by the calculation unit 12. The calculation unit 16 supplies, to the selecting unit 17, reflection point information of the still object (hereinafter referred to as still object reflection point information; an example of second reflection point information) indicative of distances and azimuths of the reflection points of the still object.

The selecting unit 17 determines whether or not the moving object is closer to the radar device 2 than the still object on the basis of the moving object reflection point information received from the calculation unit 12 and the still object reflection point information received from the calculation unit 16. In a case where the moving object is closer to the radar device 2 than the still object, the selecting unit 17 determines that the moving object reflection point information is information to be supplied to a predetermined device. Then, the selecting unit 17 supplies the moving object reflection point information to an interpolation unit 14.

For example, in FIG. 7, object vehicle 202 is closer to a radar device (not illustrated) of the subject vehicle 201 than the wall 205, and therefore the selecting unit 17 supplies, to the interpolation unit 14, reflection point information of object vehicle 202 (e.g., information indicative of distances and azimuths of reflection points included in the reflection point group 204 illustrated in FIG. 4). Since the selecting unit 17 does not supply, to the interpolation unit 14, the virtual image 206 that is reflection point information of a moving object farther than the wall 205, the virtual image 206 illustrated in FIG. 7 is not detected.

As described above, according to the present embodiment, detection of a virtual image that can occur in a case where a transmission wave reflected by a still object is reflected by a moving object. As a result, detection accuracy of a moving object improves.

In the present embodiment, an example in which the classification unit 15, the calculation unit 16, and the selecting unit 17 are added to the configuration (the object detection device 1a) illustrated in FIG. 6 has been described above. Alternatively, the classification unit 15, the calculation unit 16, and the selecting unit 17 may be added to the configuration (the object detection device 1) illustrated in FIG. 2.

In the present embodiment, an example in which the classification unit 15 is provided separately from the classification unit 11 and the calculation unit 16 is provided separately from the calculation unit 12 has been described above. Alternatively, the classification unit 11 and the classification unit 15 may be combined as a single classification unit, and the calculation unit 12 and the calculation unit 16 may be combined as a single classification unit. In this case, for example, the classification unit supplies detection result information corresponding to a still object and detection result information corresponding to a moving object separately (in a distinguishable manner) to the calculation unit, and the calculation unit supplies still object reflection point information and moving object reflection point information separately (in a distinguishable manner) to the selecting unit 17.

Embodiment 4

Figure 9:
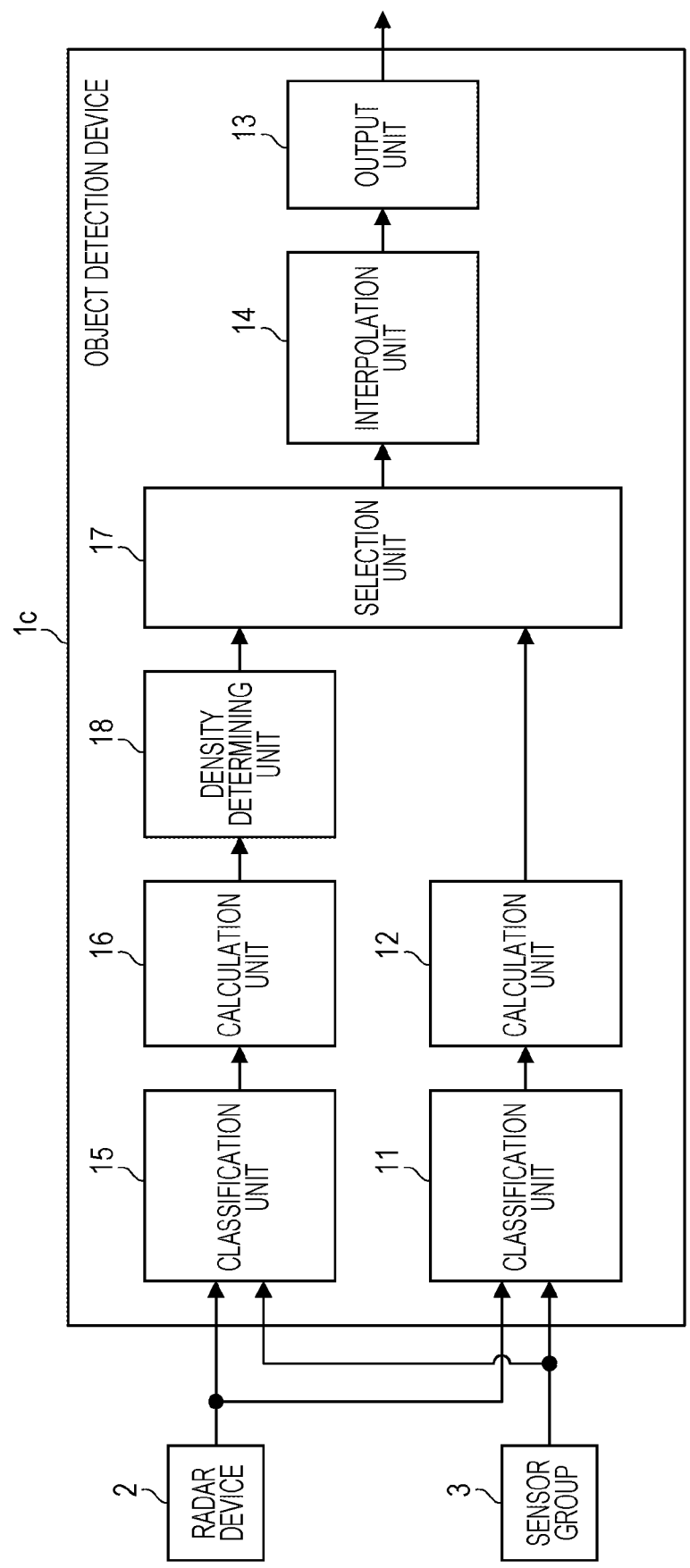
FIG. 9 is a block diagram illustrating an example of a configuration of an object detection device according to Embodiment 4.

Next, a configuration of an object detection device according to Embodiment 4 is described with reference to FIG. 9. FIG. 9 is a block diagram illustrating an example of a configuration of an object detection device 1c according to the present embodiment. In FIG. 9, constituent elements that are identical to those in FIG. 8 are given identical reference signs, and description thereof is omitted.

The object detection device 1c is different from the configuration of FIG. 8 in that the object detection device 1c includes a density determining unit 18.

The density determining unit 18 determines whether or not a density of reflection points per unit azimuth (or per unit area) is equal to or higher than a predetermined threshold value on the basis of still object reflection point information received from the calculation unit 16.

A density of reflection points of a still object varies depending on the way in which the still object is disposed and the shape of the still object. For example, a density of reflection points of a continuous wall or a guard rail is higher than a density of reflection points of a pylon disposed at predetermined intervals. The threshold value used in the process of the density determining unit 18 is, for example, a minimum value of a density of reflection points by which it can be determined that a still object is a wall or a guard rail and is obtained on the basis of an actual geometric shape or as a result of a simulation or the like.

In a case where the density of reflection points is equal to or higher than the threshold value, the density determining unit 18 determines that a still object is wall or a guard rail and supplies still object reflection point information to a selecting unit 17. Meanwhile, in a case where the density of the reflection points is less than the threshold value, the density determining unit 18 determines that the still object is a pylon that does not include a wall nor a guard rail and does not supply still object reflection point information to the selecting unit 17.

As a result, still object reflection point information corresponding to a wall or a guard rail that does not include a pylon is used in the determining process of the selecting unit 17 described in Embodiment 3.

As described above, according to the present embodiment, it is possible to more effectively prevent detection of a virtual image that can occur in a case where a transmission wave reflected by a still object is reflected by a moving object. It is therefore possible to further improve detection accuracy of a moving object.

Embodiment 5

Figure 10:
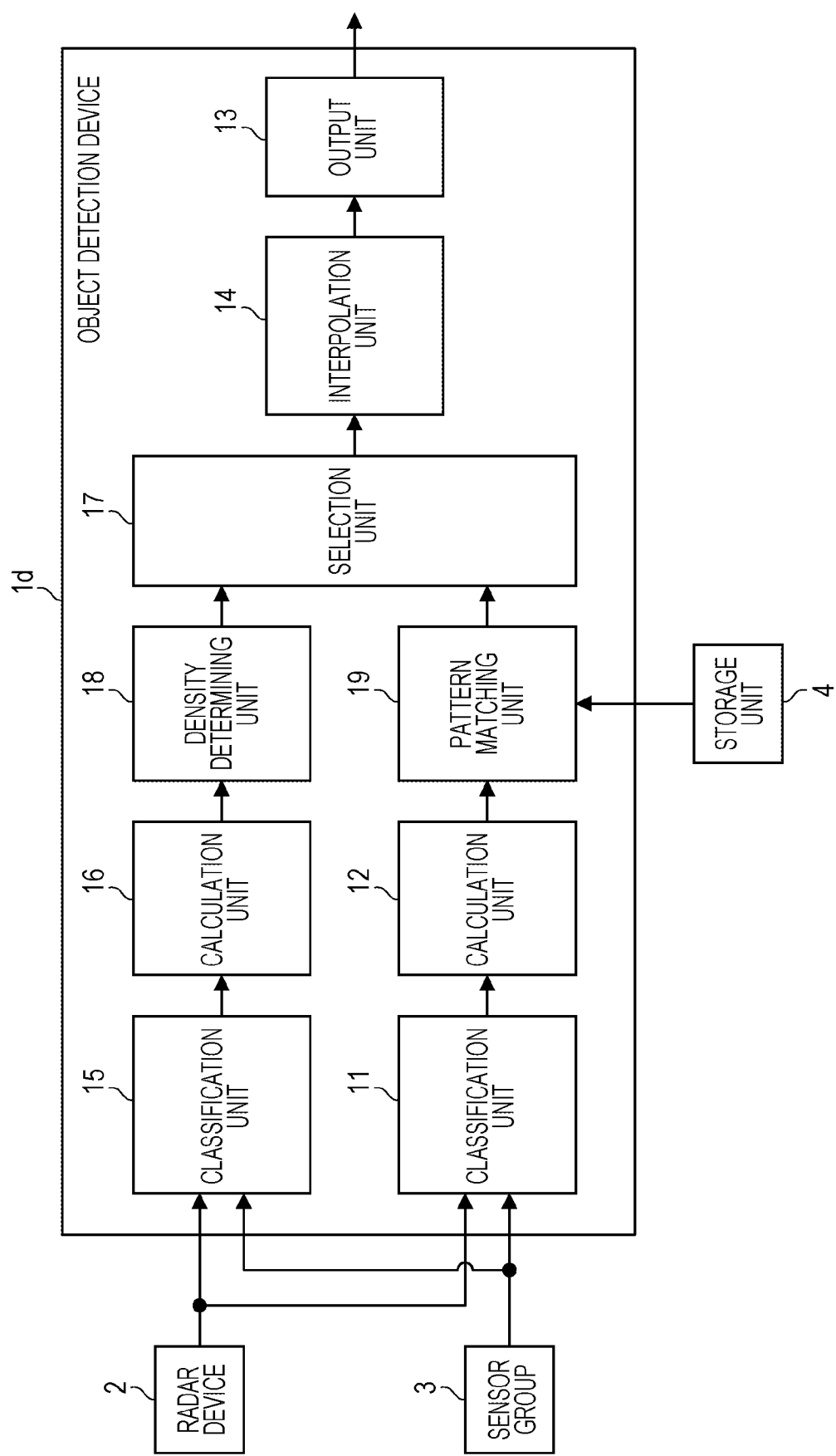
FIG. 10 is a block diagram illustrating an example of a configuration of an object detection device according to Embodiment 5.

Next, a configuration of an object detection device according to Embodiment 5 is described with reference to FIG. 10. FIG. 10 is a block diagram illustrating an example of a configuration of an object detection device 1d according to the present embodiment. In FIG. 10, constituent elements that are identical to those in FIG. 9 are given identical reference signs, and description thereof is omitted.

The object detection device 1d is different from the configuration of FIG. 9 in that the object detection device 1d includes a pattern matching unit 19.

The pattern matching unit 19 reads out pattern information from a storage device 4 after receiving moving object reflection point information from a calculation unit 12.

The pattern information is information indicative of shapes of types of moving objects. For example, the pattern information indicates shapes corresponding to a bicycle, a passenger automobile, a motorcycle, and a truck. The pattern information is prepared in advance and is stored in the storage device 4. The storage device 4 may be provided in the object detection device 1d.

The pattern matching unit 19 compares a shape indicated by moving object reflection point information with shapes indicated by the pattern information and determines a shape having a highest degree of matching. Then, the pattern matching unit 19 determines that information (hereinafter referred to as moving object type information) indicative of a type of moving object corresponding to the determined shape and the moving object reflection point information are to be supplied to a predetermined device. Then, the pattern matching unit 19 supplies the moving object reflection point information and the moving object type information to the selecting unit 17. Then, the moving object type information and the moving object reflection point information are supplied to the predetermined device via an interpolation unit 14 and an output unit 13.

As described above, according to the present embodiment, only reflection point data that has been determined to be a moving object is subjected to pattern matching. This makes it possible to reduce an amount of calculation as compared with a case where all kinds of reflection point data are subjected to pattern matching. It is therefore possible to simplify the device.

An example in which the pattern matching unit 19 is added to the configuration (the object detection device 1c) illustrated in FIG. 9 has been described above. However, in the present embodiment, the pattern matching unit 19 may be added to the configuration (the object detection device 1) illustrated in FIG. 2, the configuration (the object detection device 1a) illustrated in FIG. 6, or the configuration (the object detection device 1b) illustrated in FIG. 8, as illustrated in FIG. 10.

Embodiment 6

Detection result information obtained by a radar device 2 described above indicates physical values based on a reflected wave that is an electromagnetic wave. Accordingly, the detection result information always contains noise generated in nature and in the radar device 2. In view of this, in the present embodiment, smoothing is performed in order to reduce the noise.

Figure 11:
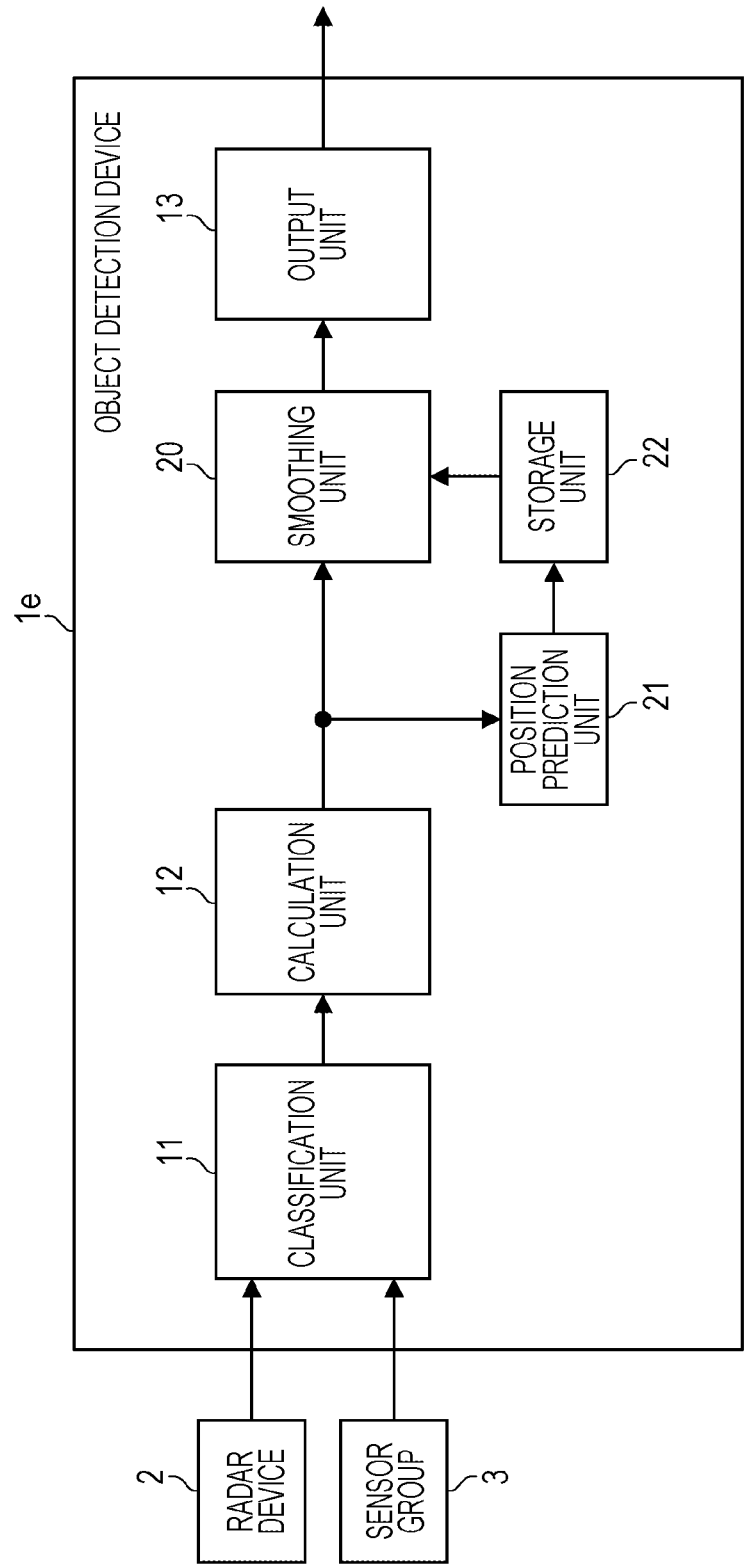
FIG. 11 is a block diagram illustrating an example of a configuration of an object detection device according to Embodiment 6.

A configuration of an object detection device according to Embodiment 6 is described with reference to FIG. 11. FIG. 11 is a block diagram illustrating an example of a configuration of an object detection device 1e according to the present embodiment. In FIG. 11, constituent elements that are identical to those in FIG. 2 are given identical reference signs, and description thereof is omitted.

The object detection device 1d is different from the configuration of FIG. 2 in that the object detection device 1d includes a smoothing unit 20, a position prediction unit 21, and a storage unit 22.

In FIG. 11, a calculation unit 12 supplies reflection point information corresponding to a moving object to the smoothing unit 20 and the position prediction unit 21 at a predetermined time interval. This reflection point information includes information on Doppler velocities of reflection points corresponding to the moving object in addition to information on distances and azimuths of the reflection points of the moving object.

Upon receipt of the reflection point information corresponding to a moving object at a first timing, the position prediction unit 21 predicts positions (hereinafter referred to as predicted positions) of the reflection points of the moving object at a second timing on the basis of the Doppler velocities indicated by the reflection point information and the time interval. The second timing is a timing after elapse of the time interval from the first timing. A specific example of this position prediction process will be described later with reference to FIG. 12.

Then, the position prediction unit 21 causes information indicative of the predicted positions (hereinafter referred to as predicted position information) to be stored in the storage unit 22. The storage unit 22 may be provided separately from the object detection device 1e.

Upon receipt of reflection point information corresponding to a moving object at a second timing, the smoothing unit 20 reads out the predicted position information indicative of the positions predicted at the first timing from the storage unit 22.

Then, the smoothing unit 20 smooths the reflection point information corresponding to a moving object received at the second timing on the basis of the predicted position information and supplies the smoothed reflection point information corresponding to a moving object to an output unit 13. For example, the smoothing unit 20 calculates an average of the positions of the reflection points corresponding to the moving object indicated by the predicted position information and the positions of the reflection points indicated by the reflection point information. The smoothing unit 20 may calculate an average of azimuths or an average of Doppler velocities instead of an average of the positions of the reflection points. A smoothing method is not limited to this, and any of other known methods may be applied.

Figure 12:
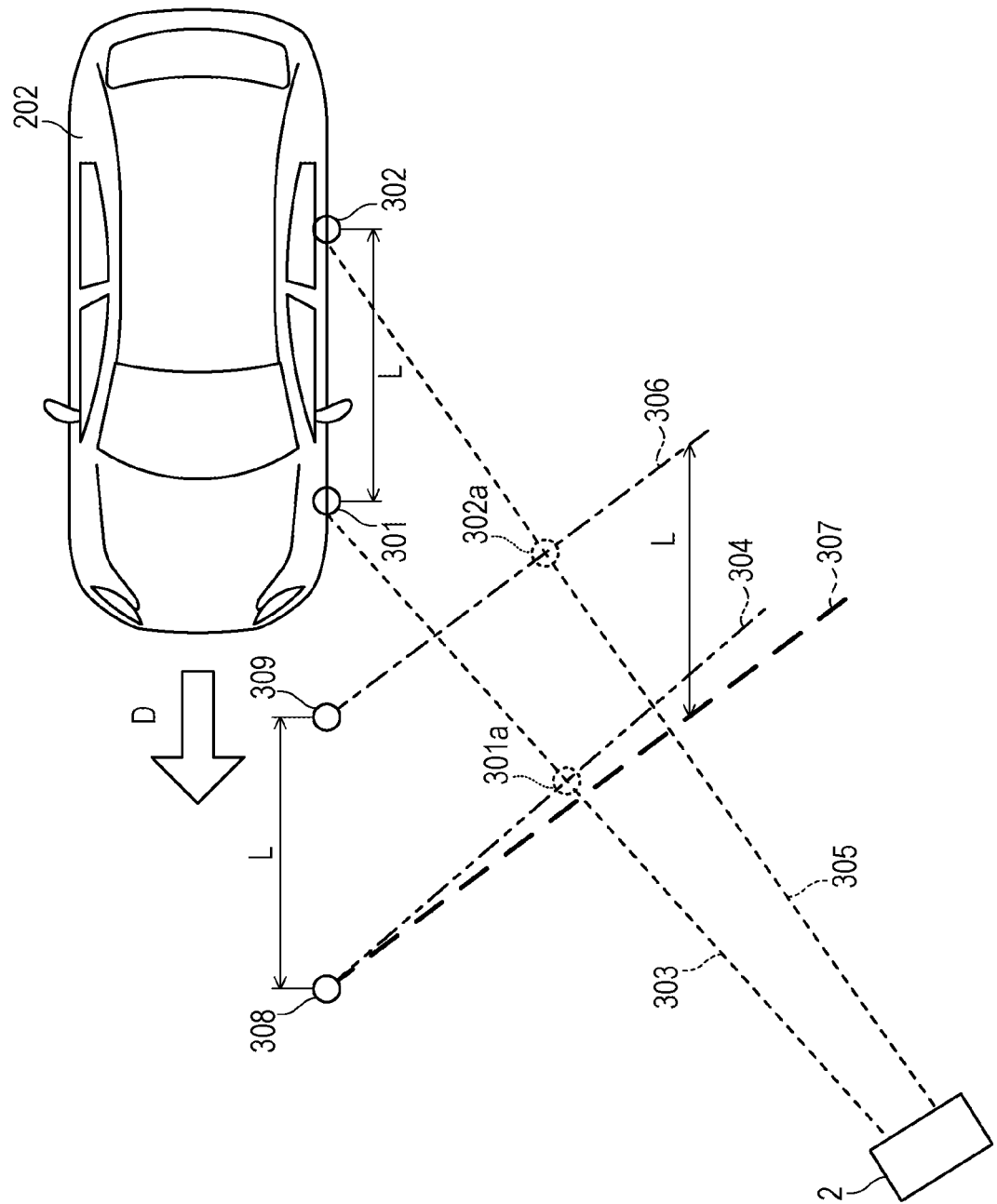
FIG. 12 is a view for explaining an example of a position prediction process according to Embodiment 6.

Next, a specific example of the position prediction process performed by the position prediction unit 21 is described with reference to FIG. 12. In FIG. 12, illustration of a subject vehicle 201 illustrated, for example, in FIG. 1 is omitted. Although illustration of the subject vehicle 201 is omitted, it is assumed that the subject vehicle 201 on which the radar device 2 and the object detection device 1e are mounted is present on the left ahead of object vehicle 202 running on a traveling direction indicated by the arrow D.

Furthermore, it is assumed in the following description that the subject vehicle 201 and object vehicle 202 continue to run in the traveling direction indicated by the arrow D.

First, the position prediction unit 21 selects, for example, two reflection points 301 and 302 of object vehicle 202.

Although the number of reflection points that can be selected by the position prediction unit 21 is two or more, the following discusses an example in which two reflection points are selected. The reflection points 301 and 302 are, for example, reflection points included in a reflection point group 204 illustrated in FIG. 4.

Next, the position prediction unit 21 calculates a point 301a on a straight line 303 that connects the reflection point 301 and the radar device 2 on the basis of a Doppler velocity of the reflection point 301. Then, the position prediction unit 21 calculates a straight line 304 that passes the point 301a and is orthogonal to the straight line 303.

Similarly, the position prediction unit 21 calculates a point 302a on a straight line 305 that connects the reflection point 302 and the radar device 2 on the basis of a Doppler velocity of the reflection point 302. Then, the position prediction unit 21 calculates a straight line 306 that passes the point 302a and is orthogonal to the straight line 305.

Next, the position prediction unit 21 calculates a straight line 307 by moving the straight line 306 in the traveling direction by a distance L between the reflection point 301 and the reflection point 302.

Next, the position prediction unit 21 calculates an intersection point 308 of the straight line 304 and the straight line 307. The intersection point 308 is a predicted position of the reflection point 301.

Furthermore, the position prediction unit 21 calculates a point 309 by moving the intersection point 308 by the distance L in a direction opposite to the traveling direction. The point 309 is a predicted position of the reflection point 302.

An example of the position prediction process has been described above.

An example in which reflection points on a left side face of object vehicle 202 are used has been described above. Alternatively, for example, reflection points on a front face of object vehicle 202 may be used. An example in which two reflection points are used has been described above. Alternatively, three or more reflection points may be used.

In the present embodiment, an example in which the smoothing unit 20, the position prediction unit 21, and the storage unit 22 are added to the configuration (the object detection device 1) illustrated in FIG. 2 has been described above. Alternatively, the smoothing unit 20, the position prediction unit 21, and the storage unit 22 may be added to the configuration (the object detection device 1b) illustrated in FIG. 8, the configuration (the object detection device 1c) illustrated in FIG. 9, or the configuration (the object detection device 1d) illustrated in FIG. 10, as illustrated in FIG. 11.

As described above, according to the present embodiment, it is possible to reduce noise contained in detection result information.

An object detection device according to the present disclosure includes: a classifier that receives, from a radar device that transmits a transmission wave and receives a reflected wave that is the transmission wave reflected by an object around a subject vehicle, detection result information indicative of an intensity, an azimuth, and a Doppler velocity of the reflected wave, the Doppler velocity being a velocity obtained from a Doppler frequency shift of the reflected wave, and determines whether the detection result information is first detection result information corresponding to a moving object or second detection result information corresponding to a still object; a calculator that calculates distances from the radar device to respective reflection points of the moving object on a basis of the first detection result information; and an output that supplies, to a predetermined device, first reflection point information indicative of the distances of the respective reflection points of the moving object and azimuths of the respective reflection points of the moving object based on the radar device.

The object detection device according to the present disclosure is configured such that the classifier determines that the detection result information is the second detection result information in a case where the azimuth of the reflected wave is an angle θ with respect to a traveling direction of the subject vehicle and where the Doppler velocity is a product of a velocity of the subject vehicle and cos θ.

The object detection device according to the present disclosure further includes an interpolator that performs interpolation on the distances of the respective reflection points of the moving object indicated by the first reflection point information on a basis of a distance of a reflection point present at an azimuth shifted by a predetermined angle from a right-angled direction that crosses at right angles with a traveling direction of the subject vehicle in a case where the moving object is present in the right-angled direction.

The object detection device according to the present disclosure is configured such that the calculator calculates distances from the radar device to respective reflection points of the still object on a basis of the second detection result information; and the object detection device further includes a selector that determines that the first reflection point information is to be supplied to the predetermined device in a case where the selector determines that the moving object is closer to the radar device than the still object on a basis of second reflection point information indicative of the distances of the respective reflection points of the still object and azimuths of the respective reflection points of the still object viewed from the radar device and the first reflection point information.

The object detection device according to the present disclosure further includes a density determiner that determines whether or not a density of the reflection points of the still object per unit azimuth is equal to or higher than a predetermined threshold value on a basis of the second reflection point information, wherein the density determiner supplies the second reflection point information to the selector in a case where the density of the reflection points is equal to or higher than the threshold value and does not supply the second reflection point information to the selector in a case where the density of the reflection points is less than the threshold value.

The object detection device according to the present disclosure further includes a pattern matching unit that determines that moving object type information indicative of a type of moving object corresponding to a shape having a highest degree of matching is to be supplied to the predetermined device together with the first reflection point information on a basis of a shape of a plurality of reflection points indicated by the first reflection point information and pattern information indicative of shapes of respective predetermined types of moving objects.

The object detection device according to the present disclosure further includes a position predictor and a smoother that receive the first reflection point information indicative of Doppler velocities of the respective reflection points of the moving object at a predetermined time interval, wherein the position predictor calculates, on a basis of the Doppler velocities indicated by the first reflection point information received at a first timing and the time interval, predicted positions of the respective reflection points of the moving object at a second timing that is later than the first timing; and the smoother smooths positions of the respective reflection points indicated by the first reflection point information received at the second timing on a basis of the predicted positions.

The object detection device according to the present disclosure is configured such that the position predictor predicts positions of a plurality of reflection points of the moving object.

The object detection device according to the present disclosure is configured such that the position predictor selects a first reflection point and a second reflection point of the moving object, calculates a first point on a first straight line that connects the first reflection point and the radar device on a basis of a Doppler velocity of the first reflection point, calculates a first orthogonal straight line that passes the first point and is orthogonal to the first straight line, calculates a second point on a second straight line that connects the second reflection point and the radar device on a basis of a Doppler velocity of the second reflection point, calculates a second orthogonal straight line that passes the second point and is orthogonal to the second straight line, calculates a third straight line by moving the second orthogonal straight line in a traveling direction of the subject vehicle by a distance between the first reflection point and the second reflection point; determines that an intersection point of the first straight line and the third straight line is a predicted position of the first reflection point, and determines that a point obtained by moving the intersection point by the distance in a direction opposite to the traveling direction is a predicted position of the second reflection point.

A recording medium according to the present disclosure stores a program causing a computer to: receive, from a radar device that transmits a transmission wave and receives a reflected wave that is the transmission wave reflected by an object around a subject vehicle, detection result information indicative of an intensity, an azimuth, and a Doppler velocity of the reflected wave, the Doppler velocity being a velocity obtained from a Doppler frequency shift of the reflected wave, and determine whether the detection result information is first detection result information corresponding to a moving object or second detection result information corresponding to a still object; calculate distances from the radar device to respective reflection points of the moving object on a basis of the first detection result information; and supply, to a predetermined device, reflection point information indicative of the distances of the respective reflection points of the moving object and azimuths of the respective reflection points of the moving object based on the radar device.

The present disclosure is not limited to the above embodiments and can be modified in various ways.

The present disclosure can be realized as software, hardware, or software in cooperation with hardware.

Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a field programmable gate array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure is applicable to an object detection device, an object detection program, and a recording medium for detecting an object around a vehicle.

What is claimed is:

1. An object detection device comprising:
   a processor; and
   a memory storing instructions that, when executed by the processor, cause the object detection device to:
   receive, from a radar device that transmits a transmission wave and receives a reflected wave that is the transmission wave reflected by an object around a subject vehicle, detection result information indicative of an intensity, an azimuth, and a Doppler velocity of the reflected wave, the Doppler velocity being a velocity obtained from a Doppler frequency shift of the reflected wave, and determine whether the detection result information is first detection result information corresponding to a moving object or second detection result information corresponding to a still object;
   calculate distances from the radar device to respective reflection points of the moving object based on the first detection result information;
   supply, to a predetermined device, first reflection point information indicative of the distances of the respective reflection points of the moving object and azimuths of the respective reflection points of the moving object based on the radar device;
   determine that the first reflection point information is to be supplied to the predetermined device in a case where the moving object is determined to be closer to the radar device than the still object based on second reflection point information indicative of the distances of the respective reflection points of the still object and azimuths of the respective reflection points of the still object viewed from the radar device and the first reflection point information;
   determine whether a density of the reflection points of the still object per unit azimuth is equal to or higher than a predetermined threshold value based on the second reflection point information,
   wherein the distances from the radar device to respective reflection points of the still object are determined based on the second detection result information, and
   wherein the second reflection point information is supplied for determining whether the moving object is closer to the radar device than the still object in a case where the density of the reflection points is equal to or higher than the threshold value, and the second reflection point information is not supplied for determining whether the moving object is closer to the radar device than the still object in a case where the density of the reflection points is less than the threshold value.

2. The object detection device according to claim 1, wherein
   the instructions, when executed by the processor, cause the object detection device to determine that the detection result information is the second detection result information in a case where the azimuth of the reflected wave is an angle $\theta$ with respect to a traveling direction of the subject vehicle and where the Doppler velocity is a product of a velocity of the subject vehicle and cos $\theta$.

3. The object detection device according to claim 1, wherein the instructions, when executed by the processor, cause the object detection device to perform interpolation on the distances of the respective reflection points of the moving object indicated by the first reflection point information based on a distance of a reflection point present at an azimuth shifted by a predetermined angle from a right-angled direction that crosses at right angles with a traveling direction of the subject vehicle in a case where the moving object is present in the right-angled direction with respect to the traveling direction of the subject vehicle.

4. The object detection device according to claim 1, wherein the instructions, when executed by the processor, cause the object detection device to determine that moving object type information indicative of a type of moving object corresponding to a shape having a highest degree of matching is to be supplied to the predetermined device together with the first reflection point information based on a shape of a plurality of reflection points indicated by the first reflection point information and pattern information indicative of shapes of respective predetermined types of moving objects.

5. The object detection device according to claim 1, wherein the instructions, when executed by the processor, cause the object detection device to receive the first reflection point information indicative of Doppler velocities of the respective reflection points of the moving object at a predetermined time interval,
   calculate, based on the Doppler velocities indicated by the first reflection point information received at a first timing and the time interval, predicted positions of the respective reflection points of the moving object at a second timing that is later than the first timing; and
   smooth positions of the respective reflection points indicated by the first reflection point information received at the second timing based on the predicted positions.

6. The object detection device according to claim 5, wherein
   the instructions, when executed by the processor, cause the object detection device to calculate, based on the Doppler velocities of a plurality of reflection points of the moving object, the predicted positions of the respective reflection points of the moving object.

7. A non-transitory computer-readable recording medium storing a program causing a computer to:
   receive, from a radar device that transmits a transmission wave and receives a reflected wave that is the transmission wave reflected by an object around a subject vehicle, detection result information indicative of an intensity, an azimuth, and a Doppler velocity of the reflected wave, the Doppler velocity being a velocity obtained from a Doppler frequency shift of the reflected wave, and determine whether the detection result information is first detection result information corresponding to a moving object or second detection result information corresponding to a still object;

calculate distances from the radar device to respective reflection points of the moving object based on the first detection result information; and supply, to a predetermined device, reflection point information indicative of the distances of the respective reflection points of the moving object and azimuths of the respective reflection points of the moving object based on the radar device;

determine that the first reflection point information is to be supplied to the predetermined device in a case where it was determined that the moving object is closer to the radar device than the still object based on second reflection point information indicative of the distances of the respective reflection points of the still object and azimuths of the respective reflection points of the still object viewed from the radar device and the first reflection point information;

determine whether a density of the reflection points of the still object per unit azimuth is equal to or higher than a predetermined threshold value based on the second reflection point information;

calculate distances from the radar device to respective reflection points of the still object based on the second detection result information; and supply the second reflection point information for determining whether the moving object is closer to the radar device than the still object in a case where the density of the reflection points is equal to or higher than the threshold value, and not supply the second reflection point information for determining whether the moving object is closer to the radar device than the still object in a case where the density of the reflection points is equal to or higher than the threshold value in a case where the density of the reflection points is less than the threshold value.

* * * * *